United States Patent [19]

Layden et al.

[11] Patent Number: 4,664,731

[45] Date of Patent: May 12, 1987

[54] PULTRUSION OF GLASS AND GLASS-CERAMIC MATRIX COMPOSITES

[75] Inventors: George K. Layden, Hartford; Karl M. Prewo, Vernon, both of Conn.

[73] Assignee: The United States of America as represented by the Secretary of the Navy, Washington, D.C.

[21] Appl. No.: 689,404

[22] Filed: Jan. 7, 1985

[51] Int. Cl.$^4$ .............................................. B32B 17/00
[52] U.S. Cl. ...................... 156/89; 156/242; 156/245; 65/18.1; 264/63; 264/66; 264/332
[58] Field of Search ............. 156/89, 242, 244.11, 156/245; 65/18.1, 4.21, 54, 63; 264/1.2, 1.6, 1.7, 63, 66, 119, 332

[56] References Cited

U.S. PATENT DOCUMENTS

| | | | |
|---|---|---|---|
| 3,575,789 | 4/1971 | Siefert et al. | 156/89 |
| 3,607,608 | 9/1971 | Siefert | 264/332 |
| 3,695,960 | 10/1972 | Richter | 156/89 |
| 4,151,031 | 4/1979 | Goad et al. | 156/201 |
| 4,207,371 | 6/1980 | Otto | 156/89 |
| 4,268,562 | 5/1981 | Bacon et al. | 156/89 |
| 4,344,556 | 8/1982 | Knapp | 156/89 |
| 4,357,286 | 11/1982 | Stalcup et al. | 65/18.1 |
| 4,412,854 | 11/1983 | Layden | 65/18.1 |
| 4,464,192 | 8/1984 | Layden et al. | 65/18.1 |

Primary Examiner—Caleb Weston
Attorney, Agent, or Firm—Robert W. Adams

[57] ABSTRACT

A method of making fiber reinforced glass composite articles utilizes preimpregnated preforms which are bound with a temporary plastic binder. The binder is removed in a gradient oven and the frit or preform is drawn through a pultrusion die assembly heated to the degree necessary to render the frit workable. Deformation in the heated die assembly is maintained during cooling, resulting in a formed glass composite article.

3 Claims, 6 Drawing Figures

AMBIENT TO 1000°

000-1300°

1300°

1300 TO 600°C

PULTRUSION OF GLASS AND GLASS-CERAMIC MATRIX COMPOSITES

This invention relates generally to the manufacture of glass and/or glass-ceramic matrix composition articles through the use of pultrusion dies. More particularly, the invention may be described as a process wherein composite preform material is drawn through a heated die to effect consolidation by matrix flow and/or diffusion bonding.

Pultrusion is a process well known in the resin matrix trade and more recently adapted to metal matrix fabrication; however, it is not known to have been previously considered or used in glass or glass matrix article manufacture.

Of a related nature, although considerably different in approach and intended function, is U.S. Pat. No. 4,151,031 to Good et al, issued Apr. 24, 1979, wherein a method and apparatus for forming sheet material into continuous structural shapes is disclosed, with particular emphasis on its utility for building space platforms of plastic sheet material. Unlike the instant invention, however, the forming and shaping of the plastic is accomplished by heating and rolling the material in the weightless environment of space. While Good's method and apparatus may prove exceedingly useful in celestial environments, it may have certain limitations, such as the effects of gravity, which would render it less than efficient for a terrestrial environment. Numerous other techniques and apparatuses are available in the ceramic arts, notably for bonding and forming layers of ceramic material; however, it is believed that the instant invention comprises a novel approach to glass and glass-ceramic matrix composite article manufacture which is patently distinguishable over the aforementioned prior art.

It is an object of the present invention to provide a means for producing a variety of formed glass or glass-ceramic matrix composite structures.

This object may be accomplished by utilizing a frit impregnated fiber prepreg preform which is preheated to remove a temporary resin binder and then drawn through a heated pultrusion die assembly wherein the working temperature of the glass is exceeded and the preform is distorted by the passage through the heated die so as to assume a new shape which the vitrified material retains after it cools.

This and other objects, features, and advantages of the invention may be discerned from a perusal of the following description of a preferred embodiment taken in conjunction with the accompanying drawings.

DESCRIPTION OF A PREFERRED EMBODIMENT

Figure 1:
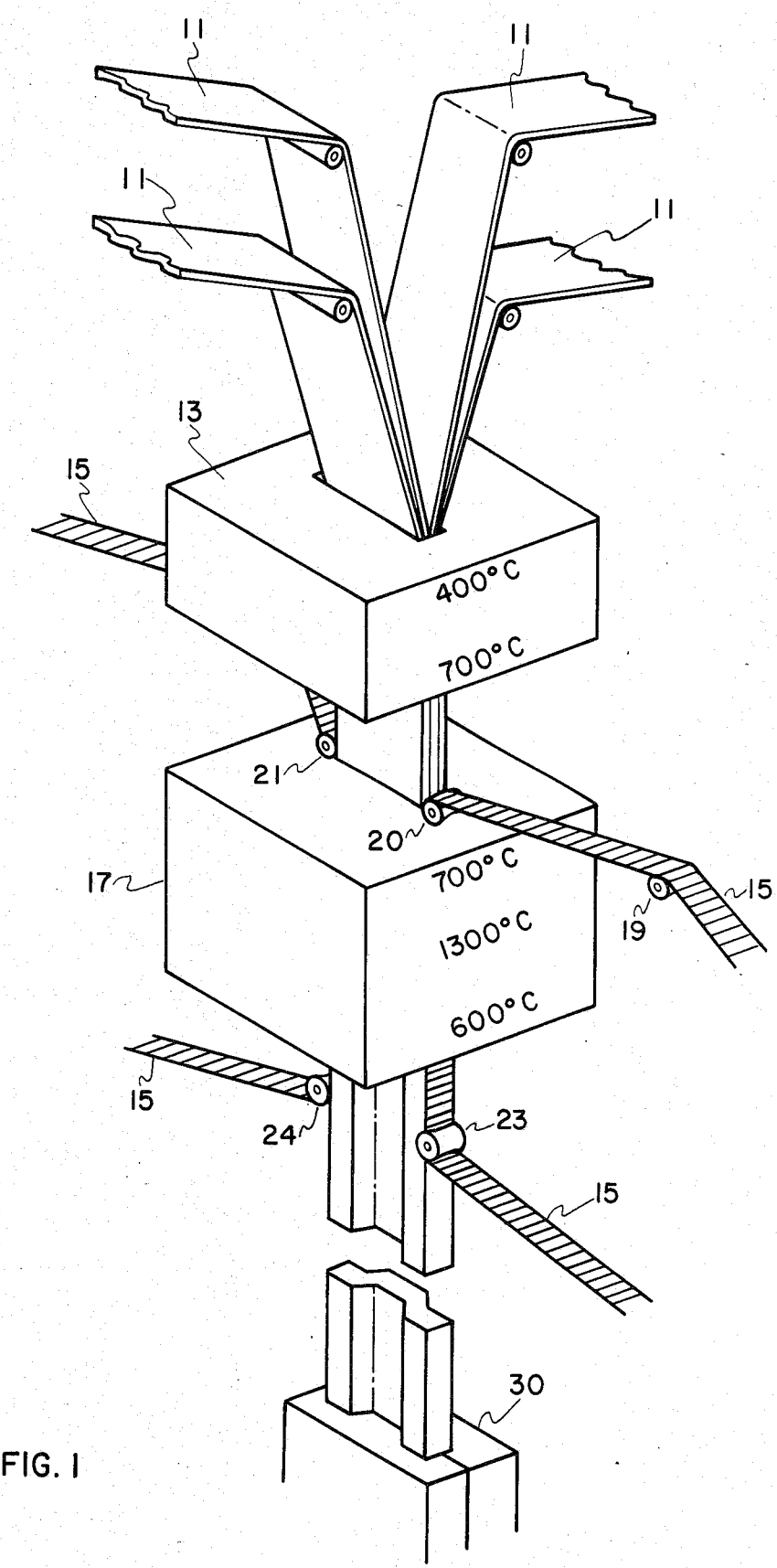
FIG. 1 is a block diagram of the pultrusion assembly.

Recent advances have made it advantageous to apply the process of pultrusion, the drawing of a material through a die, to composite material made of a fiber and glass matrix, wherein the glass and fiber composite preform is drawn through a heated die to effect consolidation by matrix flow and/or diffusion bonding. The advances have to do with the use of temporary thermoplastic resins as binders for fiber/glass frit preforms as taught in U.S. Pat. No. 4,412,854, incorporated herein by reference.

Referring to FIG. 1, prepreg tape 11, shown as originating from four different spools, or other suitable fiber/glass preform frit is unspooled and passed first into a gradient oven 13. Tape 11 is a fiber/glass preform such as referred to hereinabove which utilizes a temporary thermoplastic resin as a binder. In gradient oven 13 the resin binder is burned out and the glass is slightly sintered to prevent shedding of tape 11. In the illustration, the temperature gradient of gradient over 13 is 300° C. from 400° C. to 700° C., and presupposes a glass composite whose working point is about 1160° C. Obviously the burnout temperature of the resin binder is between 400° and 700° C. Tape 11 may or may not be joined by a metal foil separator material 15 before entering the pultrusion die assembly 17. Rollers 19, 20 and 21 facilitate the joinder. If used, separator material 15 is removed after passing through pultrusion die assembly 17 at rollers 23 and 24. Of course, tape 11 is mechanically attached to the draw bar 30 which urges tape 11 through pultrusion die assembly 17.

It is of course understood that heating a glass and fiber preform to the working point and densifying and shaping the preform assembly into a particular configuration is well known even for composite glass articles, as shown by U.S. Pat. No. 4,412,854, wherein a plurality of preforms are heated and hot pressed to form a composite article. However, the method and apparatus for forming fiber reinforced composite glass matrix articles herein disclosed is novel in the glass working field. With reference to FIG. 2, the deformation process which is utilized herein is illustrated by means of a transverse cross-section of the tape 11 as it passes through the apparatus. FIG. 2 illustrates two different configurations in which the final product may be obtained, on the left is the "hat" configuration and on the right is the "tee" configuration. The two configurations will be discussed simultaneously.

Figure 2A:
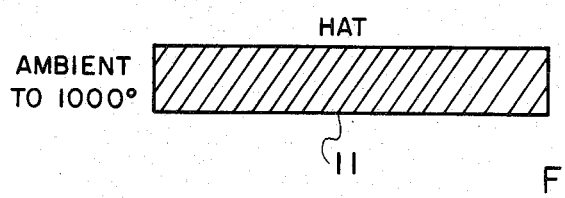
FIG. 2 is a cross-section depiction of the deformation undergone by the preform in the pultrusion assembly.
Figure 2A:
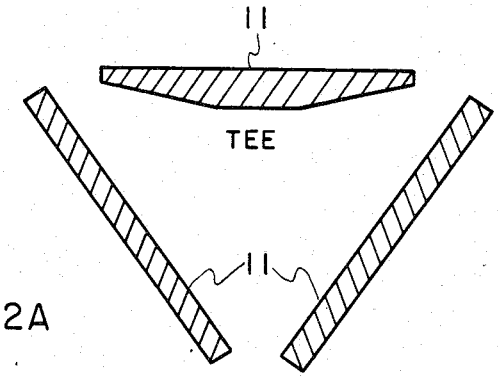
Figure 2B:
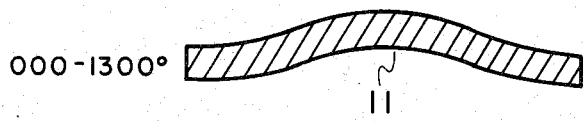
Figure 2B:
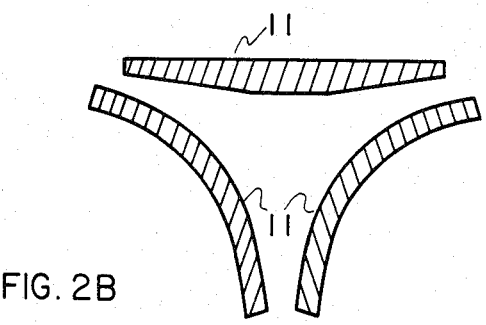
Figure 2C:
Figure 2C:
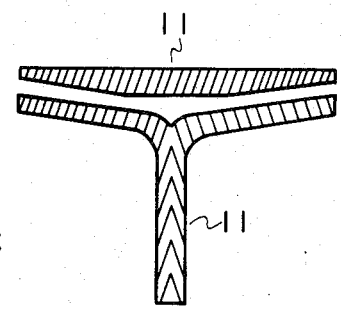
Figure 2D:
Figure 2D:
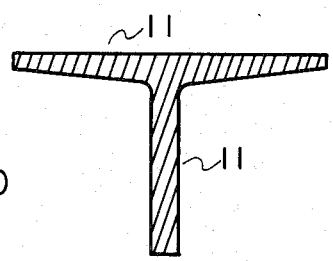

Tape 11, whether from a single source as shown in the "hat" configuration or from multiple sources as shown in the "tee" configuration, undergoes little or no deformation in passing through gradient oven 12 or the initial entry into the pultrusion die assembly 17 as the temperature is elevated to 1000° C., as shown in FIG. 2a. As tape 11 is heated through its working point to about 1300° C. and is drawn through pultrusion die assembly 17 by pull rod 30, initial deformation begins as shown in FIG. 2b. At about 1300° C., the most dramatic deformation is occurring in the heated die as shown in FIG. 2c, and during a cool down period in the die as the temperature decreases from 1300° C. to about 600° C., the final deformation, consolidation, and binding occurs as the tape 11 is drawn therethrough. It is clearly seen that to effect the pultrusion process, the full width and depth of tape 11 must be heated in the gradient oven 13 and the pultrusion die assembly 17.

Figure 3:
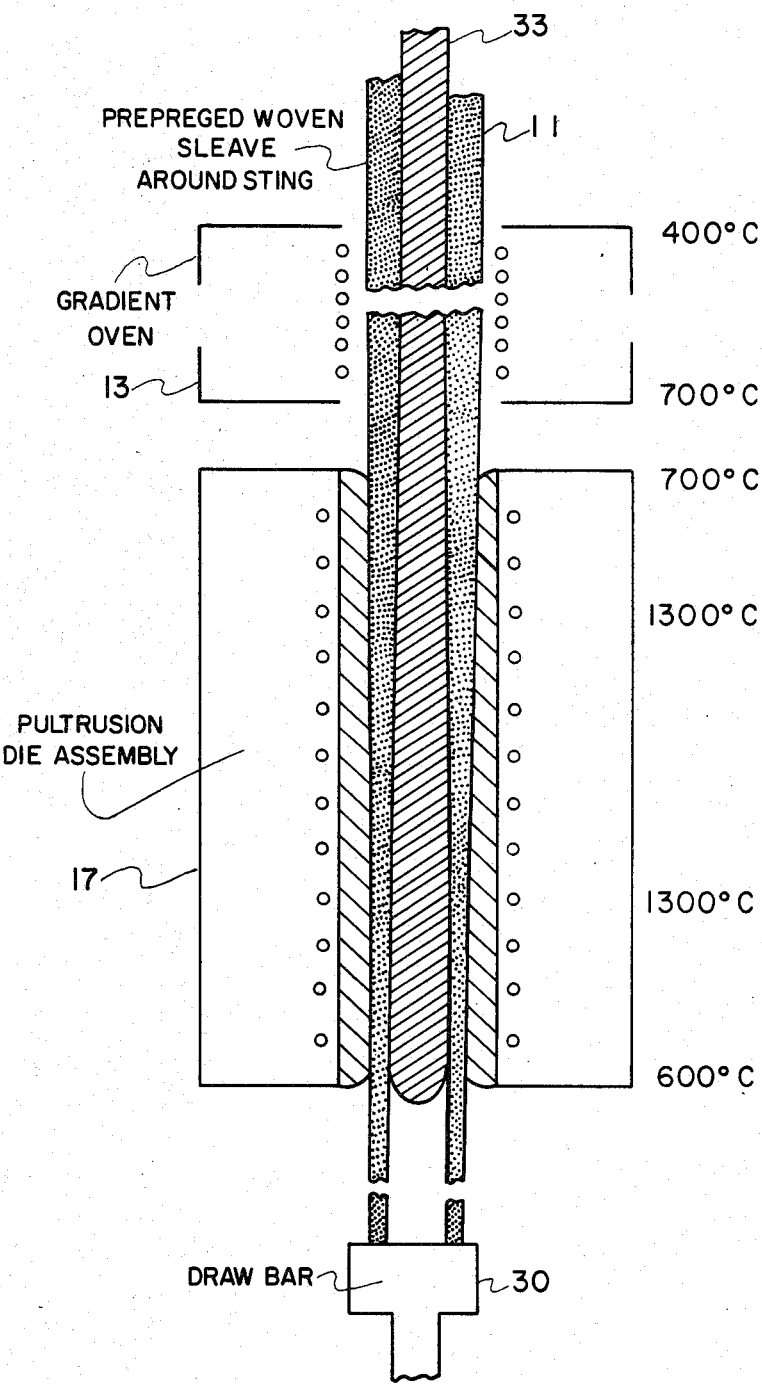
FIG. 3 is a cross-sectional view of a pultrusion assembly incorporating a stinger.

FIG. 3 illustrates the manner in which composite tubing may be formed by the pultrusion process. As previously described, the preform 11 is heated in gradient oven 13. In this instance the preform is a prepreged woven sleeve which is drawn through the pultrusion die assembly by draw bar 30. The tubular aspect of the process in this instance is effected through the use of a sting 33 about which the preform is woven, and which in conjunction with the pultrusion die assembly 17 serves to deform the heated preform to the desired attenuation and elongation.

The meaning of the term pultrusion die assembly has been presumed hereinabove; however, for the purpose of clarity the assembly is defined as a die through which a material may be drawn to transform the shape thereof in accordance with the physical contours of the die, and a means for heating the die and material, such as a furnace. The die and furnace are configured to provide for the ingress and egress of the material, in this instance a composite fiber and glass preform under the urging of a draw bar.

While the invention has been described with respect to a particular embodiment, it is to be understood that the invention includes all modifications, changes, alterations, and equivalences which come within the scope and spirit of the appended claims.

What is claimed is:

1. A method for making fiber reinforced glass composite articles comprising:

passing glass impregnated fiber preforms containing a temporary thermoplastic resin binder through a bakeout gradient oven for burnout of the binder; and passing the preform through a pultrusion die assembly to effect consolidation by matrix flow and diffusion bonding, thus yielding formed structural members; wherein passing the preform through the pultrusion die assembly comprises drawing said preform through a heated pultrusion die; heating said assembly and preform to between about 1000 degrees C. and about 1300 degrees C.; providing intermediate deformation of said preform at a temperature of about 1300 degrees C.; and providing final deformation and bonding of said preforms as the temperature decreases between about 1300 degrees C. and about 600 degrees C.

2. A method of making fiber reinforced glass composite articles comprising the steps of:

passing continuous strip glass impregnated fiber preforms containing a temporary thermoplastic resin binder through a bakeout gradient oven for burnout of the binder; and passing the preform through a pultrusion die assembly to effect consolidation by matrix flow and diffusion bonding, thus yielding formed structural members;

wherein said preforms are woven about a sting longitudinally disposed through said gradient oven and pultrusion die assembly, said sting cooperating with said die assembly to deform said preform; and wherein said preform is removed from said sting such that said formed structural members are hollow.

3. A method of making fiber reinforced glass composite articles comprising:

passing glass impregnated fiber preforms containing a temporary thermoplastic resin binder through a bakeout gradient oven for burnout of the binder; and passing the preform through a pultrusion die assembly to effect consolidation by matrix flow and diffusion bonding, thus yielding formed structural members;

wherein the said step of passing the preform through a pultrusion die assembly comprises the further steps of mechanically drawing said preform through an oven wherein the preform is heated to a temperature below the working point of the glass but yet high enough to be effective for burnout of the said thermoplastic resin binder;

thereafter drawing said preform into the said pultrusion die;

continuously heating the preform beyond the working point thereof without deformation;

causing an initial deformation by heating the preform to a temperature beyond the working point; and cooling the preform below the working point.

* * * * *